United States Patent Office
3,059,372
Patented Oct. 23, 1962

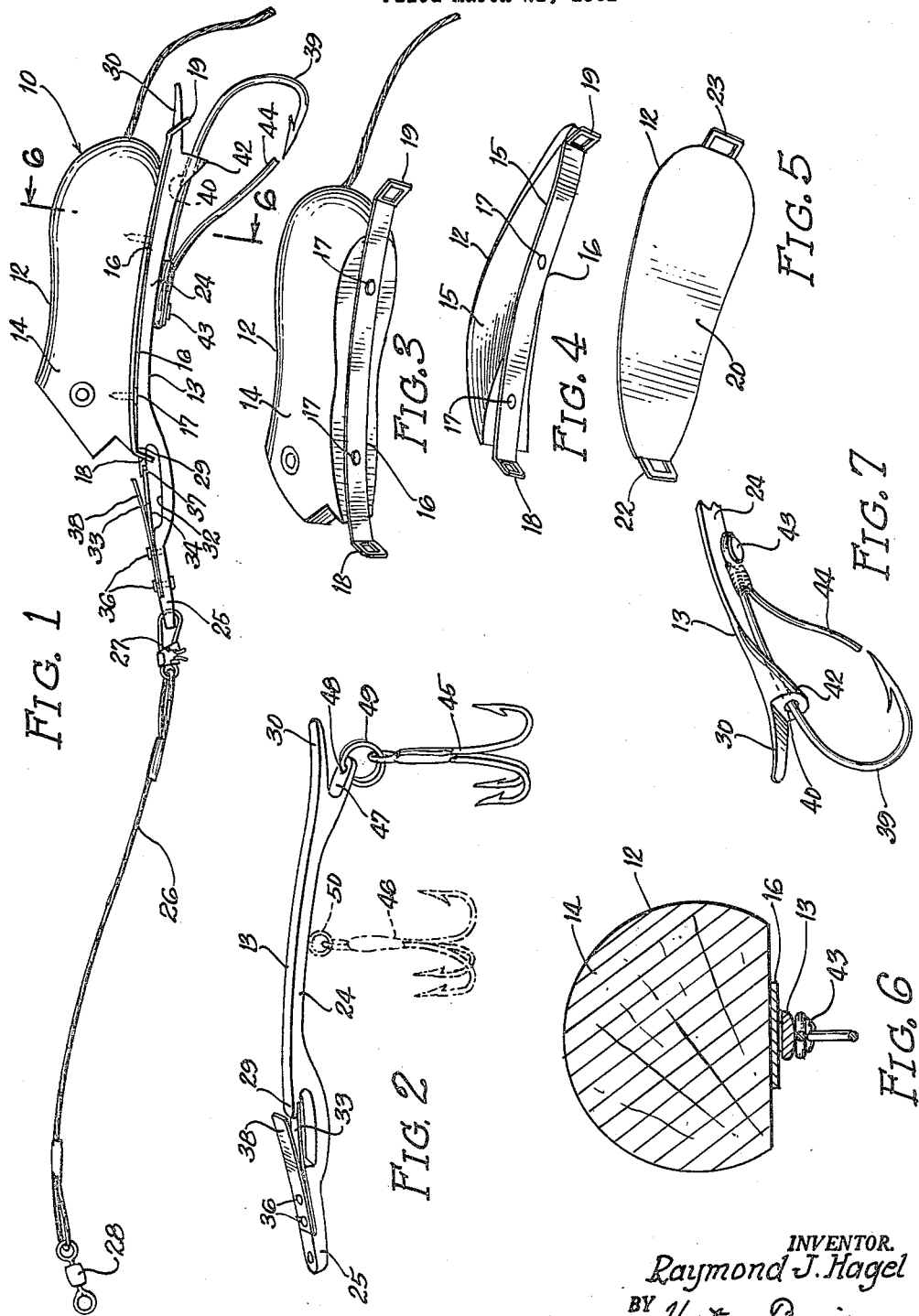

3,059,372
ARTIFICIAL FISH LURE
Raymond J. Hagel, 1200 N. Orange St., Peoria, Ill.
Filed Mar. 21, 1961, Ser. No. 97,245
8 Claims. (Cl. 43—42.09)

This invention relates to artificial fish lures, and more particularly to such lures having separable bodies and hook assemblies, so that types, colors and kinds of lure bodies can be conveniently carried for use with the same or different types of hook assemblies.

When a variety of artificial fish lures of the usual types having hooks attached thereto is carried in a tackle box, and unless a compartment is provided for each lure, the hooks of different lures become entangled, so as to render use and interchange both slow and awkward. Furthermore, when hooks constitute permanent parts of each lure, many more lures must be carried to have a variety of hook types and arrangements along with a variety of body types, colors and sizes.

One of the objects of this invention is to provide an artificial fish lure having a hook assembly which is attachable directly to a fishing line, and to or from which hook assembly various types and colors of bodies can be quickly and easily attached or detached.

Another object of my invention is to provide an artificial fish lure embodying separable hook assembly and body parts, and wherein the hook assembly incorporates a manually releasable spring latch for securing the body part in place thereon, which spring latch is accompanied by guard means for protecting the latch from undesired release, as well as from catching on or becoming fouled by weeds.

As another object, this invention comprehends artificial fish lures having separable and interchangeable body and hook assembly parts, and wherein means provides closed fastening loops in predetermined spaced relationship to one another at opposite ends of the body and said hook assembly includes an attaching bar having a hook secured thereto and oppositely projecting prongs thereon spaced for simultaneous engagement with said closed fastening loops, together with manually operable latch means for releasably holding the closed fastening loops in engagement with the prongs for effecting separable attachment of the body to the hook assembly.

This invention further has within its purview the provision of artificial fish lures having interchangeable body and hook assembly parts, and wherein the hook assembly includes an attaching bar as a relatively rigid and rugged structure to which hooks may be attached so as to be substantially stationary or freely movable with respect to the attaching bar.

Other objects and advantages of the invention will be apparent from the following description and the accompanying drawings in which similar characters of reference indicate similar parts throughout the several views.

FIG. 1 is a side elevational view of an artificial fish lure embodying a preferred form of my invention and showing the lure with a leader for a fishing line attached thereto;

FIG. 2 is a perspective view from one side which illustrates a modification of a portion of the structure depicted in FIG. 1;

FIG. 3 is a perspective view of the lure body portion of the structure illustrated in FIG. 1, with the lure body turned from the position of FIG. 1 to indicate details of the structure;

FIGS. 4 and 5 are perspective view of modified lure bodies adapted to use as parts of my artificial fish lure;

FIG. 6 is an end sectional view of the lure body structure taken substantially as indicated by a line 6—6 and accompanying arrows in FIG. 1; and FIG. 7 is a fragmentary perspective view of a portion of the structure shown in FIG. 1 and showing the structure from a position different from that of FIG. 1.

In the exemplary embodiment of the invention which is shown in the accompanying drawings for illustrative purposes, an artificial fish lure 10 has two manually separable parts, one of which is a lure body 12, and the other of which is a hook assembly 13. By having the lure body and hook assembly adapted to manual separation, an extremely wide variety of different shapes, kinds, types and colors of lure bodies can be utilized with hook assemblies having various types and combinations of hooks thereon. Furthermore, the lure bodies can be stored together in a tackle box without having their hooks become tangled, inasmuch as the hooks can be removed from the various bodies and stored separately when not in use. Also, a large variety of combinations is possible with the separable parts, as illustrated.

In the modification depicted in FIGS. 1, 3 and 6, a main body portion 14 is shaped to resemble a mouse. This main body portion may be made of wood, suitably colored by paint or of a suitably colored molded plastic material. It may be readily understood by those skilled in the art of fishing that various body shapes, types, kinds and colors may be used, as, for example, the main body portion may resemble the shape of a fish or a buck tail, or may even be of some other or more abstract form, such as the main body portion 15 of FIG. 4. In each instance, the main body shapes are devised to give the lure action during motion through the water which is attractive to the fish.

Each of the exemplary lure bodies 12, shown in FIGS. 1, 3, 4 and 6 includes a body anchoring element 16 in the form of a metal strip secured to the bottom of the main body portion 14 by fastening means, such as screws 17, and which body anchoring element extends longitudinally of the main body and has integrally formed and closed anchoring loop portions 18 and 19 at its opposite ends. To facilitate the mounting of a lure body on various hook assemblies, the anchoring loop portions 18 and 19 are spaced apart a predetermined distance which is related to the spacing of portions of the hook assembly 13, as will be more fully described.

In the modification shown in FIG. 5, the lure body 12 is in the form generally referred to as a metal spoon. In this instance, a main body portion 20 is stamped from sheet metal, and is usually curved from end to end, longitudinally of the body, and often is laterally curved, also. In this type of lure body, anchoring loop portions 22 and 23 are made integrally with the main body portion 20, and are disposed at the opposite ends of the main body portion in a spaced relationship to one another which is substantially the same as that utilized for the body anchoring elements which are attached to the main body portions, as in FIGS. 1, 3 and 4.

The hook assembly illustrated in FIGS. 1 and 7 includes an attaching bar 24 which is a relatively long and narrow integrally formed piece which may be made of metal, molded plastic, nylon, bent wire or other suitable and relatively strong and rigid material which is adapted to be formed, stamped or cast, and having a front end portion 25 to which a fishing line 26 is attachable, as by a clasp 27 suited and adapted to the purpose. When the fishing line 26 embodies a leader portion, a swivel 28 of a conventional type may be utilized therewith to prevent the action of the lure from twisting the main portion of the line.

In the illustrated lures, the attaching bar 24 has relatively rigid front and rear prongs 29 and 30 integrally formed thereon, which prongs extend forwardly and rearwardly of the lure in opposite and spaced relationship to one another. The lengths and spacing of the prongs is related to the spacing between the anchoring loop portions of the body anchoring element 16. As shown in FIGS. 1 and 2, the adjacent ends of the prongs 29 and 30 are spaced from one another a distance less than the distance between the anchoring loop portions 18 and 19 or 22 and 23 on the lure body. However, the prongs 29 and 30 have lengths such that their remote ends are spaced apart a distance greater than the distance between the anchoring loop portions on the lure body. In my disclosed structure the prongs 29 and 30 differ in length, and the rear prong 30 is longer than the front prong 29. The openings in the anchoring loop portions 18, 19, 22 and 23 are of a size such that the anchoring loop portions are freely movable along the respective prints, as the lure body is placed thereon or removed therefrom. The anchoring loop portions, however, fit the respective prongs, so that when the lure body is attached to the hook assembly, it is held in place with operative firmness, although some looseness which allows a slight chattering movement between the lure body and the attaching bar is beneficial, in that it produces a noise which is attractive to fish.

In placing one of the lure bodies on the hook assembly, the rear prong 30 is placed to extend through the rear anchoring loop portion on the lure body, and then the lure body is moved forwardly to the extent required for having the front anchoring loop portion pass the end of the prong 29. After this, the lure body is moved rearwardly with respect to the hook assembly, so that the anchoring loop portions engage both prongs to hold the lure body in place with respect to the hook assembly. In removing the lure body from the hook assembly, it is moved forwardly until the anchoring loop portion 18 passes the end of the prong 29, and then the front end of the lure body is raised away from the front prong 29, so that the rear prong 30 can be removed from its anchoring loop portion 19 by relative movement between the lure body and the attaching bar.

In the disclosed hook assembly, the attaching bar 24 has a recess 32 adjacent the front prong 29 and extending from a position beneath that prong toward the front end portion 25. For effecting secure attachment of the lure body to the hook assembly for use and to provide for the removability of the lure bodies from the hook assembly, a resilient latch 33 is utilized. In the form disclosed, the latch 33 comprises a resilient leaf spring strip 34 having one end secured to the front portion of the attaching bar by means such as rivets 36. The spring strip 34 extends rearwardly from the front end region of the attaching bar, across the recess 32 and into engagement with a notched lower surface 37 at the forward end of the prong 29. Normally the spring strip 34 is biased into firm contact with the notched end portion 37 of the prong 29. However, when manually flexed downwardly and into the recess 32 by pressure applied through the lure body during installation of a body upon the attaching bar or by finger pressure against the spring during removal of a lure body from the attaching bar, the spring strip affords space for the removal and application of the anchoring loop portions of lure bodies to the front prong 29 of the lure. It may be observed that when the spring strip is in its normal position, the lure body is firmly held in place on the hook assembly and adapted to use.

In order to provide a safety factor for the latch and to prevent the lure from becoming fouled by weeds or other objects in the water, a second leaf spring strip 38 overlies the spring strip 34 and is secured in place on the hook assembly at the forward end thereof by the same rivets 36 which effect the securement of the spring strip 34. The second spring strip 38 is curved upwardly toward its rearward end, so that it is normally spaced from the spring strip 34 and tends to deflect weeds or other objects away from the spring strip 34 as the lure moves through the water. Also, the second spring strip 38 is shorter than the spring strip 34, so that it can pass the end of the prong 29 when manually pressed downwardly against the spring strip for effecting removal of a lure body, thereby avoiding interference with the application and removal of lure bodies from the hook assemblies.

In the form illustrated in FIGS. 1 and 7, a single hook 39 extends through an opening 40 in a protuberance 42 on the rear end portion of the attaching bar 24 and is secured to the bottom surface of the attaching bar 24 by fastening means, such as a rivet 43. In the illustrated structure, a flexible and resilient wire 44 extends outwardly from the anchored portion of the hook and into close proximity with the point of the hook to prevent the hook from being fouled by weeds during use.

In the form illustrated in FIG. 2, the structure of the attaching bar is substantially like that shown in FIGS. 1 and 7, except that it is adapted to the use of one or more flexibly attached gang hooks, such as 45 and 46, instead of the single and more rigidly attached hook 39. A lug 47 extends rearwardly and downwardly from the rear end region of the attaching bar 24 and has an opening 48 therein, through which opening an attaching ring 49 extends to secure the gang hook 45 to the rear portion of the attaching bar. With this arrangement of parts, the gang hook 45 is movable with relative freedom with respect to the attaching bar. When desired, a ring 50 is provided on the mid-portion of the bottom of the attaching bar to provide for the attachment of the second gang hook 46.

From the foregoing description and by reference to the accompanying drawings, it may be readily understood that I have provided an effective and serviceable artificial fish lure which not only affords a wide variety of variations of both hooks and lure bodies with a minimum number of variable elements, and which provides for both the ease of storage and interchange of the lure bodies and hook assemblies. It is further to be noted that the fishing line is directly attached to the hook assembly, so that strains are transmitted directly through that assembly, and so that the change of lure bodies does not necessitate the disconnection of the line from the hook assembly.

Having thus described my invention, what I claim as new and desire to secure by Letters Patent of the United States is:

I claim:

1. An artificial fish lure comprising, in combination, a lure body of preselected shape and size; means secured to said lure body and providing closed fastening loops in predetermined spaced relationship to one another at opposite ends of the lure body; and a hook assembly attachable to said lure body and including an attaching bar having a top lure engaging surface extending longitudinally thereof, a hook secured to said attaching bar to depend downwardly therefrom, and means at one end of the attaching bar to which a fishing line is attachable; said attaching bar having a recess therein near said one end, said attaching bar also having prongs thereon which project in opposite directions away from one another longitudinally of the attaching bar; one of said prongs overlying a portion of said recess and extending toward said one end of the bar, said prongs being spaced for simultaneous engagement in said closed fastening loops on the lure body to hold the body in place on the attaching bar; and releasable resilient latch means on the attaching bar and normally biased into engagement with said one of the prongs and extending across said recess for releasably retaining the lure body on the attaching bar.

2. An artificial fish lure as defined in claim 1, and wherein said prongs are of different length, and said one of the prongs being the shorter.

3. An artificial fish lure comprising, in combination, a hook assembly including an attaching bar extending longitudinally of the assembly and having a hook secured thereto and having front and rear ends with means at the front end thereof to which a fishing line is attachable, said attaching bar also having a prong thereon at the rear end projecting rearwardly and a second prong near the front end projecting forwardly, said attaching bar also having a recess therein between said front end thereof and said second prong and partially overlapped by said second prong, said prongs being in predetermined spaced relationship to one another and each having a preselected length, and a lure body releasably attachable to said attaching bar and having thereon prong engaging means for holding the lure body in place on the attaching bar, said prong engaging means being spaced apart on the body a distance greater than the space between said prongs and less than the distance between the opposite projecting ends of said prongs, and manually operable releasable latch means secured to the front end region of said attaching bar and engaging the projecting end region of said second prong and overlying said recess for retaining the prong engaging means in engagement with said prongs.

4. An artificial fish lure as defined in claim 3, and wherein said prong at the rear end of the attaching bar is longer than said second prong, and wherein said latch means comprises a leaf spring having one end normally engaging the projecting end region of said second prong.

5. In an artificial fish lure adapted for use with interchangeable bodies, the combination comprising a hook assembly including a relatively long and slender attaching bar of unitary structure and having front and rear ends, said attaching bar having an integral portion at the front end to which a fishing line is attachable and having relatively rigid prongs thereon, one of which projects rearwardly from the rear end of the bar and the other of which projects forwardly at a position near and spaced rearwardly of the front end of the attaching bar, said attaching bar having a top lure body supporting surface adjoining and extending between the prongs and means on the bottom thereof to which a hook is secured, said attaching bar also having therein a recess between said top lure body supporting surface and said portion at the front end thereof, which recess is partially overlapped by the forwardly projecting prong, and latch means secured to and extending rearwardly from the front portion of the attaching bar and movably engaging the projecting front end region of said forwardly projecting prong at the front of the attaching bar.

6. An artificial fish lure comprising, in combination, a lure body of preselected shape and size, means secured to said lure body and providing closed fastening loops in predetermined spaced relationship to one another at opposite ends of the lure body, and a hook assembly attachable to said lure body and including an attaching bar having a hook secured thereto and means at one end thereof to which a fishing line is attachable, said attaching bar having a recess therein near one end, said attaching bar also having prongs thereon which project in opposite directions from one another longitudinally of the attaching bar, said prongs being spaced for simultaneous engagement in said closed fastening loops on the lure body to hold the body in place on the attaching bar, releasable latch means on the attaching bar and normally engaging one of said prongs for releasably retaining the lure body on the attaching bar, said releasable latch means comprising a first leaf spring extending across said recess in the attaching bar and biased into engagement with said one of the prongs, and a second leaf spring secured to said attaching bar and overlying the first leaf spring, said second leaf spring being normally biased to curve away from the first leaf spring and being short enough to pass said one of the prongs when flexed toward the first leaf spring.

7. An artificial fish lure comprising, in combination, a hook assembly including an attaching bar extending longitudinally of the assembly and having a hook secured thereto and having front and rear ends with means at the front end thereof to which a fishing line is attachable, said attaching bar also having a prong thereon at the rear end projecting rearwardly and a prong near the front end projecting forwardly, said prongs being in predetermined spaced relationship to one another and each having a preselected length, a lure body releasably attachable to said attaching bar and having thereon prong engaging means for holding the lure body in place on the attaching bar, said prong engaging means being spaced apart on the body a distance greater than the space between said prongs and less than the distance between the opposite ends of said prongs, manually operable releasable latch means on said attaching bar and coacting with one of said prongs for retaining the prong engaging means in engagement with said prongs, said latch means comprising a spring secured to the front end region of said attaching bar and extending rearwardly therefrom into normal engagement with the prong near the front end of the attaching bar, and means on the front end region of said attaching bar and extending rearwardly therefrom, the last mentioned means overlying said spring and terminating in laterally spaced relationship with respect to the front end of the last mentioned prong.

8. In an artificial fish lure adapted for use with interchangeable bodies, the combination comprising a hook assembly including a relatively long and slender attaching bar of unitary structure and having front and rear ends, said attaching bar having an integral portion at the front end to which a fishing line is attachable and having relatively rigid prongs thereon, one of which projects rearwardly from the rear end of the bar and the other of which projects forwardly at a position near the front end of the attaching bar, said attaching bar having a top lure body supporting surface adjoining and extending between the prongs and means on the bottom thereof to which a hook is secured, latch means at the front portion of the attaching bar and movably engaging the prong at the front of the attaching bar, said attaching bar having a recess therein between the front prong and the portion to which a fishing line is attachable, said latch means comprising a spring extending across said recess, and protective means overlying said spring and extending rearwardly thereover from the front region of the attaching bar.

References Cited in the file of this patent

UNITED STATES PATENTS

| | | |
|---|---|---|
| 2,357,478 | Koch | Sept. 5, 1944 |
| 2,427,267 | Fiskaali | Sept. 9, 1947 |
| 2,570,100 | Collins | Oct. 2, 1951 |
| 2,604,716 | Hair | July 29, 1952 |